(12) United States Patent
Booth

(10) Patent No.: US 10,136,103 B2
(45) Date of Patent: *Nov. 20, 2018

(54) IDENTIFYING CONSUMER PRODUCTS IN IMAGES

(71) Applicant: LEXMARK INTERNATIONAL, INC., Lexington, KY (US)

(72) Inventor: Robert Reed Booth, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/948,489

(22) Filed: Nov. 23, 2015

(65) Prior Publication Data

US 2017/0147903 A1    May 25, 2017

(51) Int. Cl.
| | |
|---|---|
| G06K 9/62 | (2006.01) |
| H04N 7/18 | (2006.01) |
| G06K 9/42 | (2006.01) |
| G06K 9/46 | (2006.01) |
| G06T 7/73 | (2017.01) |

(52) U.S. Cl.
CPC ............ *H04N 7/18* (2013.01); *G06K 9/42* (2013.01); *G06K 9/4671* (2013.01); *G06K 9/6211* (2013.01); *G06T 7/73* (2017.01); *H04N 7/181* (2013.01)

(58) Field of Classification Search
CPC ......... G06K 9/6211; G06K 2009/4666; G06K 9/4671; G06K 9/56; G06K 9/42; G06T 7/73; G06T 7/75; H04N 7/18; H04N 7/181

USPC ................ 382/103, 181, 190, 195
See application file for complete search history.

(56) References Cited

U.S. PATENT DOCUMENTS

| | | | |
|---|---|---|---|
| 5,351,310 A | 9/1994 | Califano et al. | |
| 6,393,150 B1 | 5/2002 | Lee et al. | |
| 6,674,900 B1 | 1/2004 | Ma et al. | |
| 7,151,863 B1* | 12/2006 | Bradley | H04N 1/3935 |
| | | | 358/525 |
| 8,120,607 B1* | 2/2012 | Legakis | G06T 17/20 |
| | | | 345/423 |
| 8,320,683 B2 | 11/2012 | Konishi | |
| 8,395,817 B2 | 3/2013 | Dai | |
| 2002/0114512 A1 | 8/2002 | Rao et al. | |
| 2003/0174876 A1 | 9/2003 | Eran et al. | |
| 2003/0179214 A1 | 9/2003 | Saund | |

(Continued)

OTHER PUBLICATIONS

Shapiro, Linda, and George C. Stockman. "Computer vision. 2001." ed: Prentice Hall (2001).*

(Continued)

*Primary Examiner* — Geoffrey E Summers

(57) ABSTRACT

Systems and methods identify consumer products in images. Known consumer products are captured as grayscale or color images. They are converted to binary at varying thresholds. Connected components in the binary images identify image features according to pixels of a predetermined size, shape, solidity, aspect ratio, and the like. The image features are stored and searched for amongst image features similarly extracted from unknown images of consumer products. Identifying correspondence between the features of the images lends itself to identifying or not known consumer products.

17 Claims, 12 Drawing Sheets

(56) References Cited

U.S. PATENT DOCUMENTS

| | | | |
|---|---|---|---|
| 2005/0249426 A1 | 11/2005 | Badawy | |
| 2006/0257031 A1 | 11/2006 | Abramoff | |
| 2007/0206881 A1 | 9/2007 | Ashikaga | |
| 2009/0196475 A1* | 8/2009 | Demirli | A61B 5/441 382/128 |
| 2009/0232358 A1 | 9/2009 | Cross | |
| 2010/0098324 A1* | 4/2010 | Fujieda | B25J 9/1697 382/154 |
| 2011/0311141 A1 | 12/2011 | Gao et al. | |
| 2014/0219569 A1* | 8/2014 | Manson | G06K 9/6267 382/201 |
| 2015/0154465 A1 | 6/2015 | Gueguen | |
| 2015/0300963 A1 | 10/2015 | Haidekker et al. | |
| 2015/0371360 A1 | 12/2015 | Mohamed et al. | |
| 2016/0005163 A1 | 1/2016 | Markov et al. | |
| 2016/0012594 A1 | 1/2016 | Romanik et al. | |
| 2016/0092417 A1 | 3/2016 | Fang | |
| 2016/0093056 A1 | 3/2016 | Ouzonis | |
| 2016/0155011 A1 | 6/2016 | Sulc et al. | |
| 2016/0189002 A1* | 6/2016 | Kawakami | G06K 9/6211 382/218 |
| 2016/0223318 A1* | 8/2016 | Liu | G06T 7/11 |

OTHER PUBLICATIONS

Ahmad, Muhammad Bilal, and Tae-Sun Choi. "Local threshold and boolean function based edge detection." IEEE Transactions on Consumer Electronics 45.3 (1999): 674-679.*

Kuznetsov, Anatoliy. "Efficient binary distance metrics." Bitmagic. 2003.*

Grauman, Kristen and Bastian Leibe; Visual Object Recognition; Synthesis Lectures on Computer Vision #1.

Belongie, Serge and Kriegman, David; Explanation of Homography Estimation; 2007; Department of Computer Science and Engineering, University of California, San Diego.

Fischler, M.A. and Bolles, R.C.; Random Sample Consensus: A paradigm for model fitting with applications to image analysis and automated cartography; 1981; Communications of the ACM, 24(6):381-395.

Wikipedia; Connected-component labeling; pp. 1-9; printed Aug. 25, 2015; https://en.wikipedia.org/wiki/Connected-component_labeling.

Wikipedia; Feature extraction; pp. 1-3; printed Nov. 13, 2015; https://en.wikipedia.org/wiki/Feature_extraction.

Matas, Jiri, et al. "Robust wide-baseline stereo from maximally stable external regions." Image and vision computing 22.10 (2004): 761-767.

* cited by examiner (Present Technique)

(Prior Technique)

IDENTIFYING CONSUMER PRODUCTS IN IMAGES

FIELD OF THE EMBODIMENTS

The present disclosure relates to identifying consumer products. It relates further to identifying known consumer products in images of unknown products, such as those captured from a store shelf. Techniques for identifying the known products in pixels of images represented by bits typify the embodiments.

BACKGROUND

Since the combination of sophisticated cameras with smart phones, mobile computing applications ("apps") have proliferated that utilize images captured by the cameras. In some of the more popular apps, users capture images of consumer products in an attempt to identify the products. The apps then link to descriptions of the products, ratings, reviews, pricing, options for purchasing, shipping, etc. Stores and businesses also have apps for imaged products that provide tips to users searching for products while on store premises, that improve inventory control, that facilitate compliance with shelf planograms, and the like. Apps also often distinguish their services based on categories of consumer products, such books, cars, clothing, electronics, groceries, etc. There are even apps for identifying consumer drugs and plants and for confirming authenticity of items.

During use, users capture images of products and/or their label/nameplate/etc. for comparisons to databases. The better the image, the faster the match to the database and the faster the results are displayed to users. Bad or poor quality images, however, beget slow matching and perhaps false matches. Non-recognition of consumer products may result if multiple products get captured in a single image, such as might be captured on multiple shelves of a store. Underlying the apps, object recognition drives technology used to identify objects in an image or video.

When objects are of a known size and orientation, image correlation or edge matching techniques are used for identification. However, such algorithms, known as global feature identification, can be quite expensive and often involve stepping through the image and performing pixel by pixel comparisons to objects in databases, which slows results. In addition, the techniques do not guard well against image distortion, partial occlusion, scale variations, rotation, and changes in image perspective.

To overcome this, several algorithms use local invariant features that are encoded to remain stable over a range of rotations, distortions, and lighting conditions. Scale Invariant Feature Transform (SIFT), Speeded-Up Robust Features (SURF), and Maximally Stable Extremal Regions (MSER) are three popular algorithms. SIFT identifies key-points in an image by finding the maxima and minima of the Difference-of-Gaussian filters over a range of scales. SIFT uses the gradient magnitude and direction of neighboring key-points to uniquely identify strong key-points. Because of the generation of large numbers of key-points, SIFT is robust against partial occlusion and some level of noise, but deteriorates with lighting changes, blurring, and large scale variations. The large numbers of key-points also means computational expense when generating volume and, in turn, finding matching key-points. In practice, key-point matching is also known to generate many false positive matches.

The SURF algorithm, improves upon SIFT by using the sums of 2D Haar wavelet responses to more quickly identify key-points and do so over a range of scales. While better, SURF still suffers disadvantages by generating too many false positives. MSER, on the other hand, identifies connected pixels whose shape does not change over a large range of thresholds which generates lower numbers of key-points. However, MSER is known to limit the types of images that can be identified using the techniques and is sensitive to blur and discretization effects.

Accordingly, a need exists in the art to better identify consumer products and do so with algorithmic techniques amongst image pixels. Further needs also contemplate instructions or software executable on controller(s) in hardware, such as imaging devices, or computing apps for smart phones or other devices. Additional benefits and alternatives are also sought when devising solutions.

SUMMARY

To overcome the above-mentioned and other problems associated with SIFT, SURF, and MSER, the inventor proposes a new, Fast Object Recognition (FOR) algorithm. FOR is similar to MSER in that it searches for connected pixels that are of a similar shape, but FOR does not force connected pixels to have a same shape over an entire range of thresholds. Instead, FOR applies three fixed thresholds (e.g., 25%, 50%, and 75%) to binarize the original image, and identifies only the regions meeting certain criteria including regional size limits, aspect ratios, and percentages of filled area. This allows FOR to find regions that are more likely to be unique descriptors in an image. FOR is also found to be easily tunable to search for objects of a specific size or shape range, allowing users to improve algorithm speed and minimize false positive matches. Rather than stepping through a large range of resized and re-sampled images like SIFT, FOR uses a single image and normalizes each image feature to a specific size so that feature matching can be performed regardless of the size of the original image. Because FOR is also a local feature detector, it is not necessary to step across the image pixel by pixel and perform computationally intensive correlation operations. FOR has been found to be robust against blurring, variations in lighting, occlusion, rotation, scale, and changes in perspective. As described more below, FOR is comprised of two stages, (1) training to extract image features from known objects of consumer products and (2) searching for those known image features in unknown images to correctly identify known objects.

In a representative embodiment, known consumer products are captured as grayscale or color images. They are converted to binary at varying thresholds. Connected components in the binary images identify image features according to pixels of a predetermined size, solidity, aspect ratio, and the like. The image features are stored and searched for amongst image features similarly extracted from unknown images of consumer products. Identifying correspondence between the image features lends itself to identifying or not known consumer products at a location from whence the unknown images were captured.

These and other embodiments are set forth in the description below. Their advantages and features will become readily apparent to skilled artisans. The claims set forth particular limitations.

DETAILED DESCRIPTION OF THE ILLUSTRATED EMBODIMENTS

In the following detailed description, reference is made to the accompanying drawings where like numerals represent like details. The embodiments are described in sufficient detail to enable those skilled in the art to practice the invention. It is to be understood that other embodiments may be utilized and that changes may be made without departing from the scope of the invention. The following detailed description, therefore, is not to be taken in a limiting sense and the scope of the invention is defined only by the appended claims and their equivalents. In accordance with the features of the invention, methods and apparatus teach the identification of consumer products in images.

Figure 1:
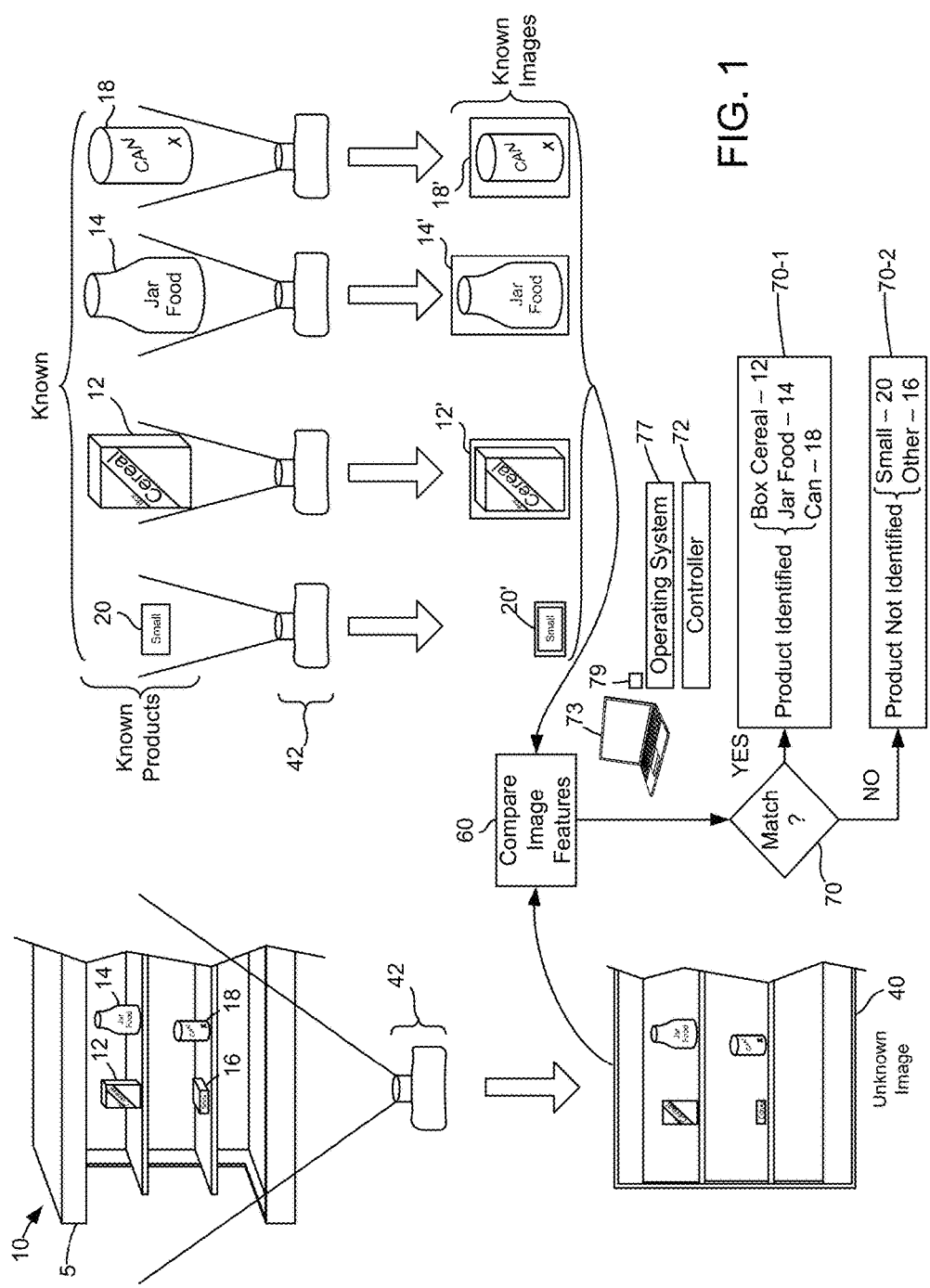
FIG. 1 is a diagrammatic view of an environment for identifying consumer products in images.

With reference to FIG. 1, an environment 10 includes pluralities of consumer products 12, 14, 16, 18, 20. The products are any of a variety, but contemplate books, clothing, electronics, groceries, and the like. They are found in stores, on the internet, in magazines, etc. Images 30 get captured of the known products so that in an unknown image 40 having one or more of the products, they can be identified therein or not. Images are captured with cameras 42, for example. Alternatively they are captured with screenshots, such as those displaying on a smart phone, or by scanning on an imaging device hard copies of media showing the products, such as by scanning advertisements. The images might be also obtained from archives, such as those gathered from a storage volume/database (not shown), or that might be sent from an attendant computing device (not shown).

In a representative embodiment, known products are given as a box of cereal 12, jar food 14, can 18, and small 20. Images 12', 14', 18' and 20' are created at 42 by taking pictures of the products. Meanwhile, a store shelf 5 has products 12, 14, 16 and 18. An image 40 is taken of the store shelf and the products therein. Yet, it is unknown what products exist on the store shelf, by way of the image 40. The inventor extracts image features 50 (FIG. 2) from each of the known images 30 and unknown image 40. (The image features, as described below, are connected components in the images determined over a range of thresholds meeting certain criteria. In the example of the CAN 18, image features correspond to the letters C-A-N.) They are compared at 60 to see whether or not the image features of the known images are found in the unknown image. If so, at 70, consumer products can be identified 70-1 in the unknown image, thus being identified on the store shelf 5. In this instance, the box cereal 12, jar food 14 and can 18 are identified. If not, at 70, consumer products are not recognized 70-2 in the unknown image, thus remain unidentified on the store shelf. Here, small item 20 is not identified as it does not exist on the store shelf 5. The other item 16 is also not identified because it has not been captured as a known image 30, nor has it been populated into a storage medium or other database of known consumer products for comparison to unknown images. The compare 60 and matching 70 can take place on a computing device 73, such as a desktop, laptop, smart phone, tablet, etc., having one or more controller(s) 75, such as an ASIC(s), microprocessor(s), circuit(s), etc., have executable instructions that act on the images. A user might also invoke a computing application 79 for initiating the techniques which is installed and hosted on the controller and/or operating system 77.

Figure 2:
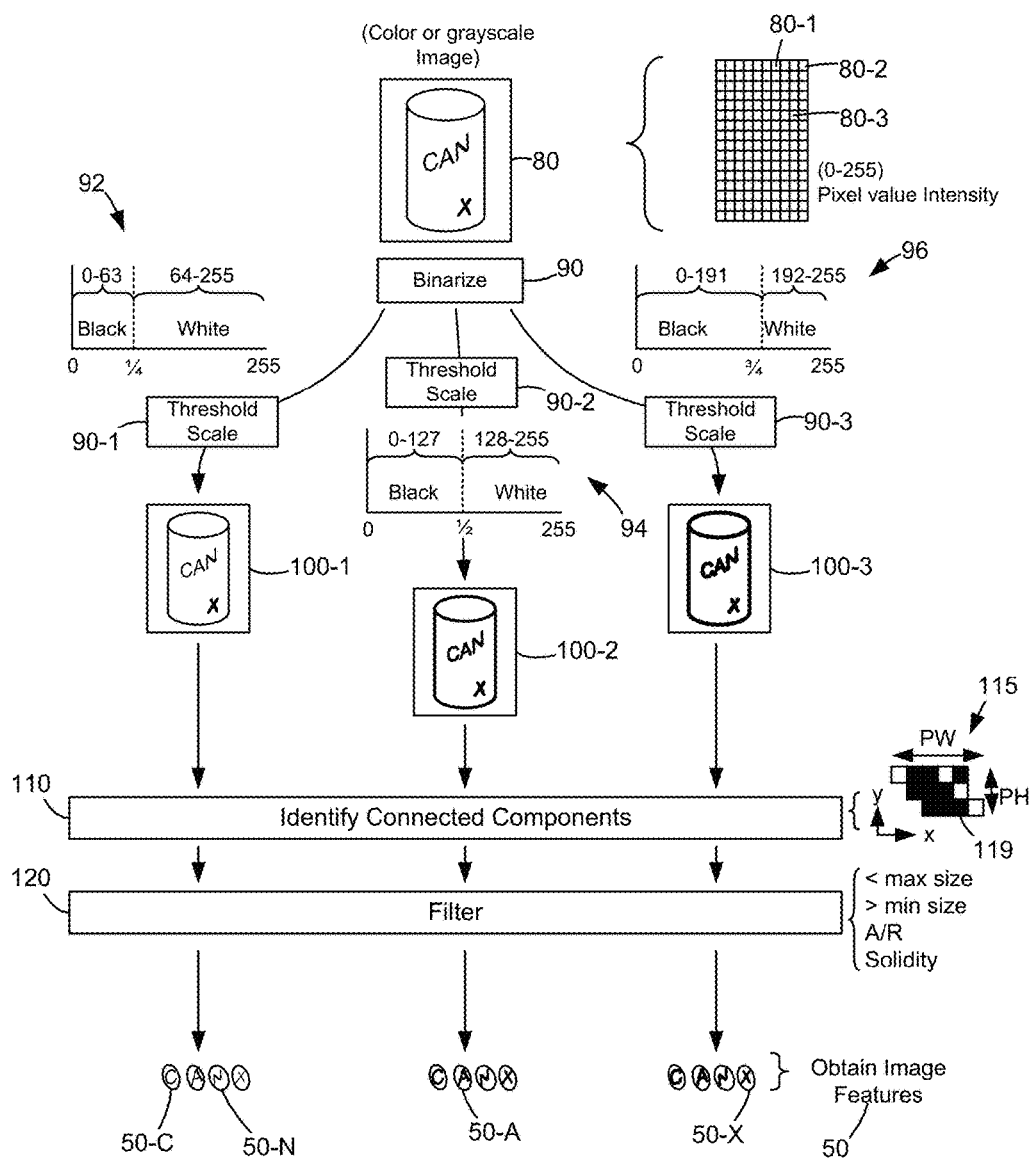
FIG. 2 is a diagrammatic view for binarizing images and extracting image features.

With reference to FIG. 2, image features 50 get extracted from images by first capturing a grayscale, color or other multi-valued image 80, such as by taking a picture of the consumer product. The image 80 is defined in pluralities of pixels 80-1, -2, -3 and each pixel has one of many pixel value intensities. A range of 256 possible values is common, e.g., 0-255, as is known. The quantity of pixels ranges in volume depending upon the resolution of the image capture, e.g., 150 dpi/ppi, 300 dpi/ppi, etc., as is also known.

Next, the image 80 is converted to binary 90. Each of the pixels 80-1, -2, -3, of the multi-valued image is converted to one of two possible binary values, 1 or 0, black or white. Conversion occurs according to one of three threshold scales 90-1, 90-2, 90-3. At graph 92, pixels of image 80 become converted to binary black pixels in image 100-1 when they have an original pixel value intensity of 25% or less of their original value. That is, pixel values 0-63 on a scale of 0-255 become binary black in image 100-1. Else, they become binary white when their original pixel value intensity is a value of 64-255. Similarly, pixels of image 80 become converted to binary pixels in images 100-2 and 100-3. Binary black pixels become set in the binary image when their original pixel value intensities are less than 50% or less than 75%, respectively. In image 100-2, original pixel value intensities of 0-127 become set to binary black, else they are set to binary white for original pixel value intensities of 128-255 as seen in graph 94. In image 100-3, original pixel value intensities of 0-191 become set to binary black, else they are set to binary white for original pixel value intensities of 192-255 as seen in graph 96. Other conversion schemes are possible. In any, the result is three binary images 100 that correspond to the multi-valued image 80. Image 100-1 is also a relatively light image, whereas image 100-3 is a relatively dark image. The lower threshold is designed to separate overlapping dark features while the upper threshold separates relatively light features. Image 100-2 provides a lightness/darkness balance between images 100-1 and 100-3. The 50% threshold is designed to separate out mid-tone colors.

Once done, connected components are identified at 110 in each of the three binary images 100. Since the binary images become binarized at 90 according to different thresholds 90-1, 90-2, 90-3, the connected components identified at 110 correspond to generally black connected components, white connected components and mid-tone connected components. The techniques for identifying connected components in images are known in the art. They are known by various names and include techniques for connected-component analysis, blob extraction, region labeling, blob discovery, region extraction, vision analysis, and the like. Some of the more popular algorithms include Tarjan's algorithm and Kosaraju's algorithm, to name a few. Various algorithms also generally separate their approach along one or two passes of the pixels and how strongly or not one pixel is connected to a next pixel.

Once identified, the connected components 115 are filtered at 120 to separate out unwanted connected components from a group or set of possible image features 50 for a binarized image 100 not meeting certain predefined limits For example, the inventor has selected at least the following criteria for filtering: pixel size of the connected component, aspect ratio of the pixels of the connected component, and solidity limit of the pixels of the connected component. It is preferred that for the size of a connected component to be considered an image feature 50 it needs to have a pixel height (ph) or a pixel width (pw) in excess of 17 pixels and both the pixel height and pixel width needs to be less than 350 pixels. For an aspect ratio of a connected component to be considered an image feature 50, the aspect ratio of pixel height to pixel width needs to be less than 5, preferably less than 3. Solidity is the proportion of the pixels in the smallest convex polygon that can contain the region that are also in the region. Components that have more than 90% solidity often do not contain enough uniqueness to be useful for object recognition. Components with less than 20% solidity are less stable over a range of different scales. For a connected component to be considered an image feature 50, the solidity limit needs to be between 30% and 90%. In this way, connected components that are too small, too large, too obtuse, or minimally solid are excluded as being image features defining a consumer product in a binarized image 100 corresponding to the consumer product. Image features will also have a centroid pixel 119 defining the center of its shape and other pixels will be known in relation thereto, such as with a pixel distance in x-y coordinates relative to the centroid pixel. For the image 18' (FIG. 1 or image 80, FIG. 2), for example, the image features 50-C, 50-A, 50-N, 50-X extracted for consideration correspond to the letters C-A-N and the X for identifying whether or not the image corresponds to the can 18. Of course, other criteria are possible.

Figure 3A:
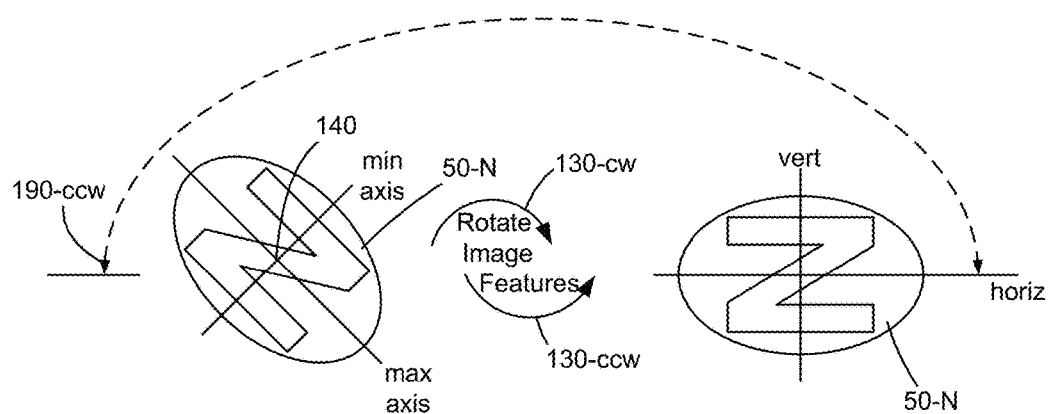
FIGS. 3A and 3B are diagrammatic views for overcoming rotation variance in image features.
Figure 3B:
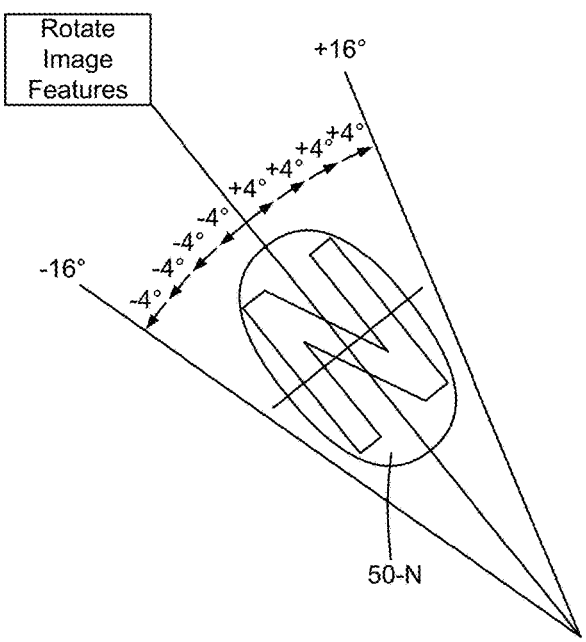

With reference to FIGS. 3A and 3B, skilled artisans will appreciate that image features can appear differently in various images according to their location on a consumer product, their orientation on the consumer product, the location of the camera capturing the image, the angle of image capture, or for other reasons. To ensure that image features have a common orientation for ease of searching or comparing against other image features, the inventor herein sets forth a common orientation for all image features to ensure rotation invariance from one image to the next. In one design (FIG. 3A), each image feature, e.g., 50-N, is rotated clockwise 130-CW or counterclockwise 130-CCW about its centroid 140 to align its maximum and minimum axes of an ellipse 145 (containing the image feature) with a horizontal (horiz.) and vertical (vert.) axis of pixels, respectively. Since the ellipse has the same second moments as the image feature under consideration, e.g., 50-N, this makes it possible to accurately identify features regardless of rotation. Alternatively, FIG. 3B shows the rotation of the maximum axis four times each in increments of +/−4° increments for a total of 32°, that being −16° to +16°.

Figure 4:
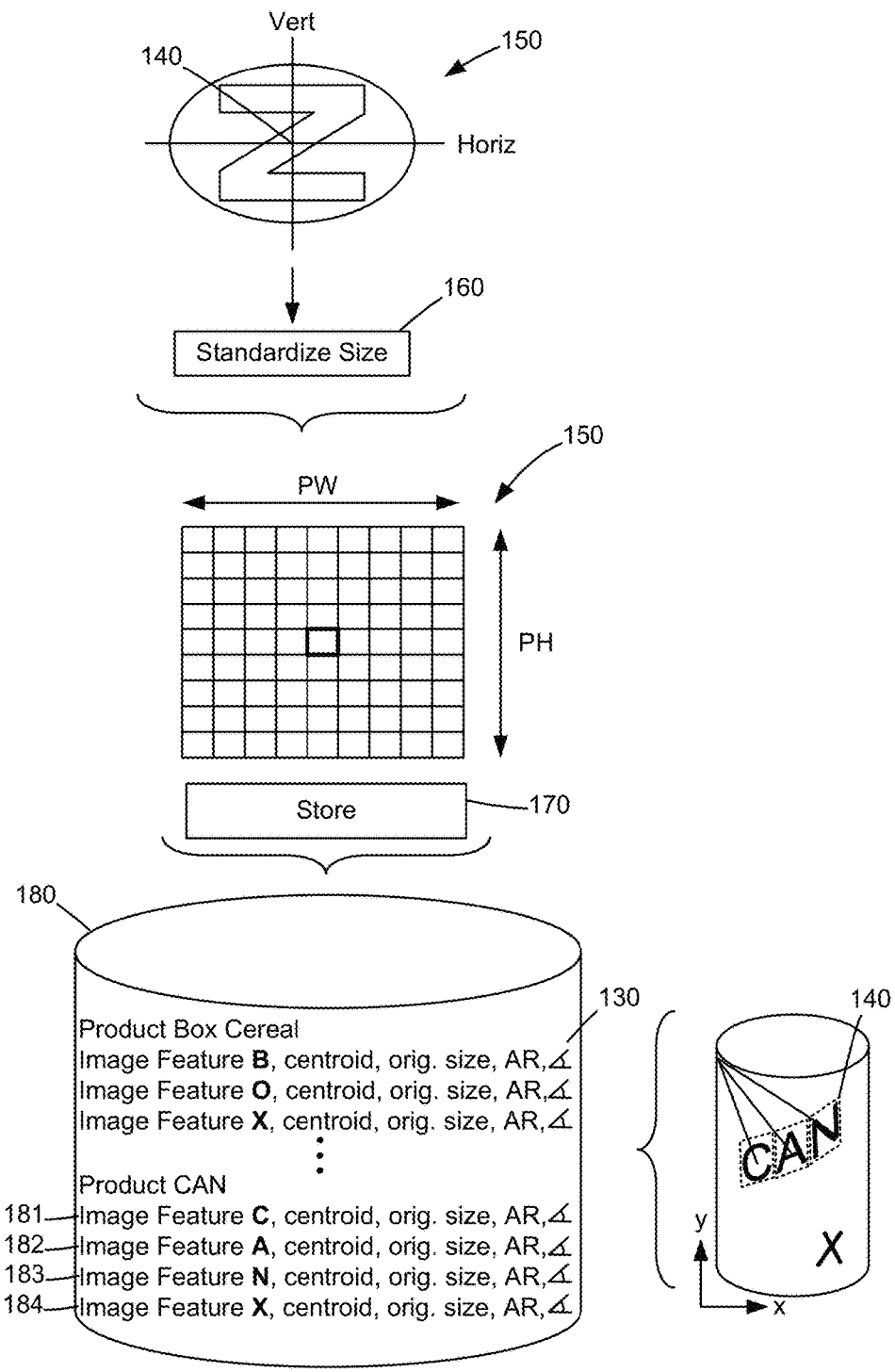
FIG. 4 is a diagrammatic view and flow chart for standardizing sizes of image features and storing same.

With reference to FIG. 4, each rotated image feature 150 becomes standardized in pixel size 160 so that all image features have a common size. In a representative design, each image feature is padded symmetrically so that the dimensions for pixel width (PW) and pixel height (PH) are the same from one image feature to the next and have an m×n array size. In one design, m equals n and such is a pixel size of 30×30 pixels. To accomplish this, the centroid of image feature is calculated first by taking the average of the coordinates of each white pixel in the image feature. Next, an auto-scale factor is determined by taking the average distance of each white pixel from the centroid. The coordinates of each pixel are normalized by subtracting the coordinates of the centroid, and dividing by the auto-scale factor. This causes the x and y coordinates of most pixels in the image feature to be mapped between −1.0 and +1.0. Next the x and y coordinates are multiplied by 14.5 and added to 15.5. This generally maps the x and y coordinates to a range of 1 to 30. The coordinates are then rounded to the nearest integer. Next, a 30×30 pixel image is initialized to all black pixels. Each pixel in the 30×30 pixel image is converted to white if its coordinates match one of the auto-scaled coordinates. This makes it possible to have a uniform size for all image features.

Thereafter, the image feature of standardized size 160 is stored 170 in a storage medium/database 180 as a 900 (30×30) bit string. The database entry also contains a hierarchy of image features per each consumer product, e.g., consumer product CAN, consumer product BOX CEREAL, etc., and each lists image features thereof, e.g., image feature C 181, image feature A 182, image feature N 183, image feature X 184, for the consumer product CAN. The entry in the database for each image feature also contains the x and y coordinates of the centroid 140 of the image feature, the size of the image feature in pixels before conversion into a standardized size at 160, the aspect ratio of the image feature (pixel height/pixel width) before conversion into a standardized size at 160, and the rotation angle of the image feature, such as 130-cw or 130-ccw as noted in FIG. 3A or the incremental approach to rotation as noted in FIG. 3B.

To account for perspective changes, such as skew in an original image, the coordinates of the original image are multiplied by a series of affine transformation matrices that simulate +/−60 degrees of rotation about the X and Y axes in steps of 15°. This also occurs for each of the binary images obtained from the original image. The results are all also stored (not shown) in the database.

Figure 5A:
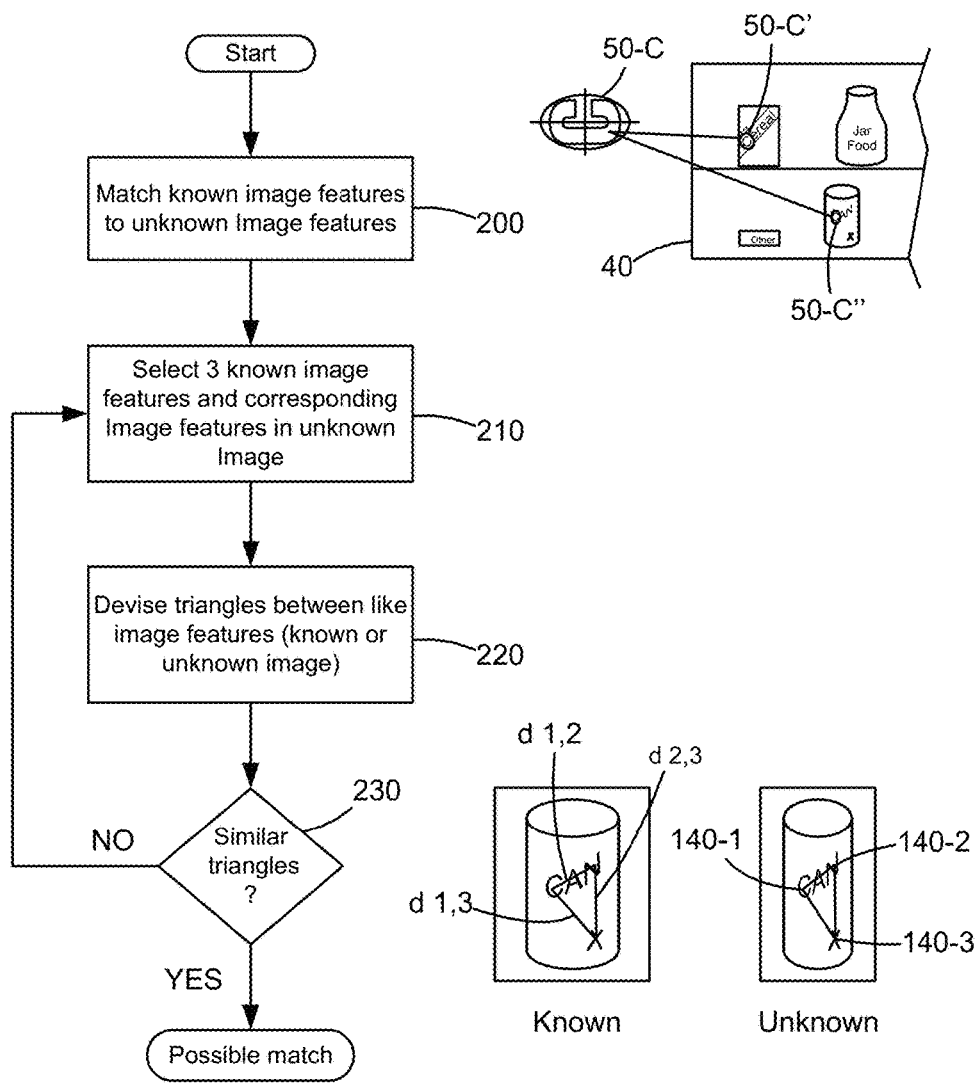
FIGS. 5A and 5B are flow charts for matching image features and identifying consumer products.

With reference to FIG. 5A, image features of known consumer products are now compared to image features extracted from unknown images to see if they match 200. As an example, an image feature 50-C (FIG. 2, also stored as 181, FIG. 4) for the letter C in the image 18' (FIG. 1) for the consumer product CAN 18 (FIG. 1), is now matched or not to image features extracted in an unknown image 40. As seen, image feature 50-C potentially matches to the image feature 50-C' for the letter "C" in the BOX 'C'EREAL consumer product as well as matches to the image feature 50-C" for the letter "C" in the 'C'AN consumer product. Next, the database is indexed according to the aspect ratio of the auto-rotated features so that feature matching is only performed on two features with similar aspect ratios. This prevents comparing every image feature to every possible similar image feature and speeds processing.

At 210, three image features are then selected from known images of known consumer products as are three corresponding image features selected from an unknown image. A "corresponding image feature" is known by how close or not it exists to the image feature of the known image. That each image feature is saved as a 900 bit string in the storage medium/database, a bitwise XOR is executed followed by a population count of 1s and 0s. If there is a perfect match between image features, there will be zero 1s in the bit string 212 after the XOR operation. For a less than perfect match, there will be some number of 1s in the bit string. Provided there is a 10% or less of instances of binary is in the 900 bit string after the XOR operation, the inventor considers this a sufficient correlation between corresponding image features in the known and unknown image. Else, it is not a corresponding image feature. A low population count of 1s corresponds to strong matches, whereas a high population count corresponds to weak matches. As noted by the inventor, a contemporary UNIX workstation can perform 20 million of these comparisons per second, making it possible for this algorithm to execute quickly and identify correspondence in real-time amongst many image features.

Figure 5B:
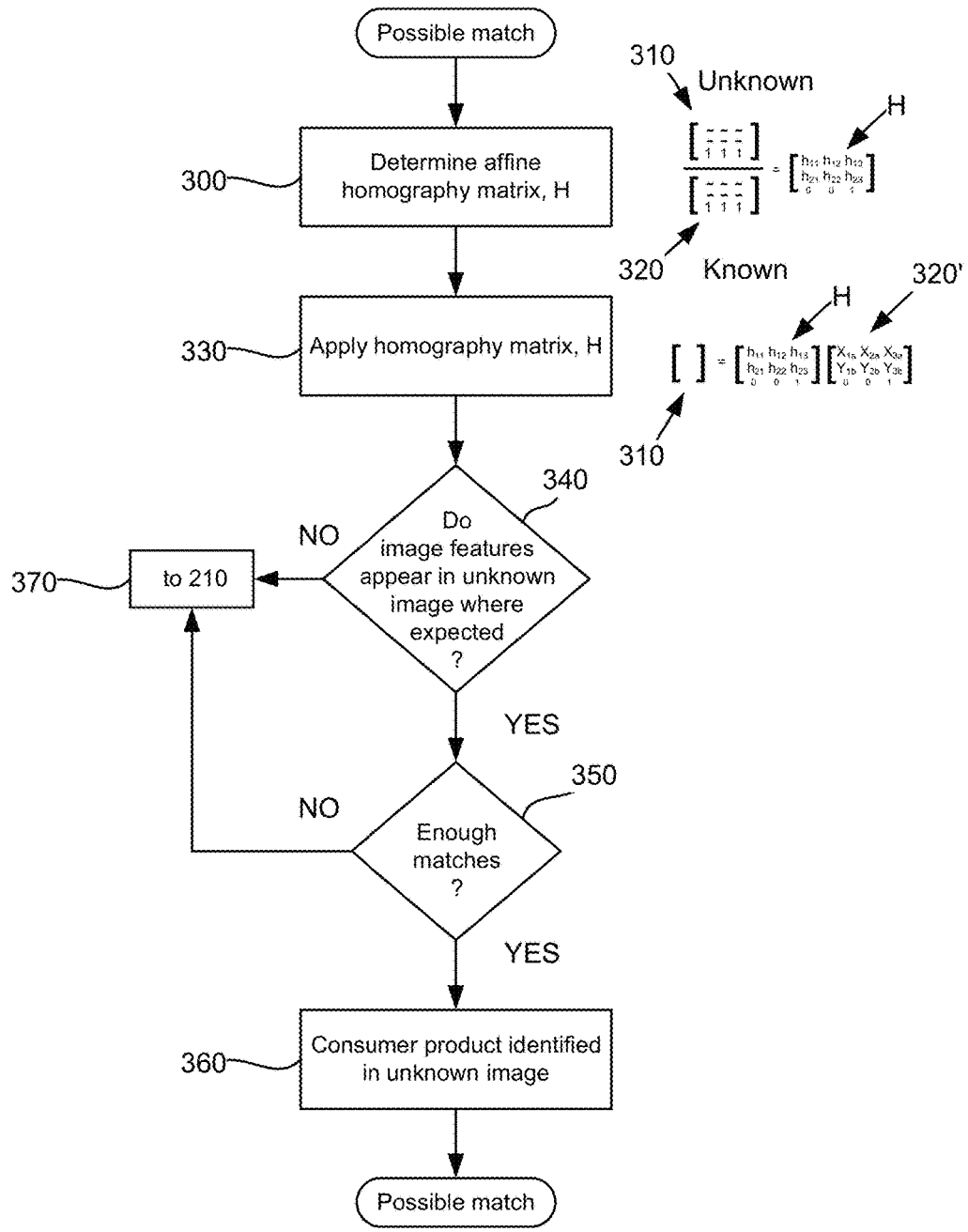

When matches for three nearby image features in the known image have been found in the unknown image, a triangle at 220 is drawn to connect the centroids of the three features in the known image. Likewise, another triangle at 220 is drawn to connect the features in the unknown image corresponding to those identified in the known image. If the triangles are similar, then a possible match between the images exists. In turn, a possible match exists to a known consumer product, 230, thus identifying or not known consumer products at a location from whence the unknown image was captured. Artisans will appreciate, however, that the triangles are just algorithmic constructs and not necessarily triangles drawn on an image, for instance. Instead, each image feature has its centroid 140 saved in the storage medium/database as well as its x-y coordinates of pixels in an image. A distance, d, between each of the centroids is calculated in each of the known and unknown images, such that three lines of distance are known, $d_{12}$, $d_{23}$, $d_{13}$. In turn, the angles between the lines are also known and similar triangles from geometry can be determined or not. If no match exists at 230, the process is repeated for another three image features and corresponding image features in an unknown image until matches are found or no more sets of three image features can be compared to one another. The process repeats as often as necessary. Similarly, the process repeats when finding possible matches. When possible matches are found at 230, FIG. 5B delineates the subsequent process.

In such, 300 denotes the determination of an affine homography matrix, H.

$$\begin{bmatrix} x_{1b} & x_{2b} & x_{3b} \\ y_{1b} & y_{2b} & y_{3b} \\ 1 & 1 & 1 \end{bmatrix} = \begin{bmatrix} h_{11} & h_{12} & h_{13} \\ h_{21} & h_{22} & h_{23} \\ 0 & 0 & 1 \end{bmatrix} * \begin{bmatrix} x_{1a} & x_{2a} & x_{3a} \\ y_{1a} & y_{2a} & y_{3a} \\ 1 & 1 & 1 \end{bmatrix}$$

$$\begin{bmatrix} \text{Unknown} \\ \text{Coordinates} \end{bmatrix} = \begin{bmatrix} \text{Homography} \\ \text{Matrix} \end{bmatrix} * \begin{bmatrix} \text{Known} \\ \text{Coordinates} \end{bmatrix}$$

That is, for the centroid coordinates [x, y] of the three image features in the unknown image 310 multiplied by the inverse of the centroid coordinates of the corresponding three image features in the known image 320, the homography matrix H is defined. The homography matrix correlates the coordinates of the features in the unknown image to the corresponding coordinates of the features in the known image. In turn 330, for every known image feature having known coordinates 320', multiplication of this matrix by the now-known homography matrix H reveals the coordinates 310' of every image feature in the unknown image. The controller next determines whether image features appear in the unknown image where they might be expected, based upon the knowledge of the coordinates of the image features of the known image, 340. This is done by multiplying the homography matrix by the centroid coordinates of the remaining features in the known image to determine the location of the features in the unknown image. If there are enough matches, 350, then the consumer products can be said to be identified in the unknown image 360. Else, next image features are selected and the process repeated, 370.

In practice, if at least 90% of the entirety of the image features in the known image has matches in the unknown image, then the output is saved as a possible match. This process is repeated for a fixed number of iterations, each time selecting a different set of three features in an unknown image with matches contained in a single known object. If more than one possible match is contained in a single area, the object with the higher percentage of matching features is chosen. Because it is not necessary to find all of the features from the known image, this method of object detection is robust against partial occlusion. This leverages techniques from a process called Random Sample Consensus (RANSAC), an iterative method that solves mathematical models in the presence of outliers.

Figure 6A:
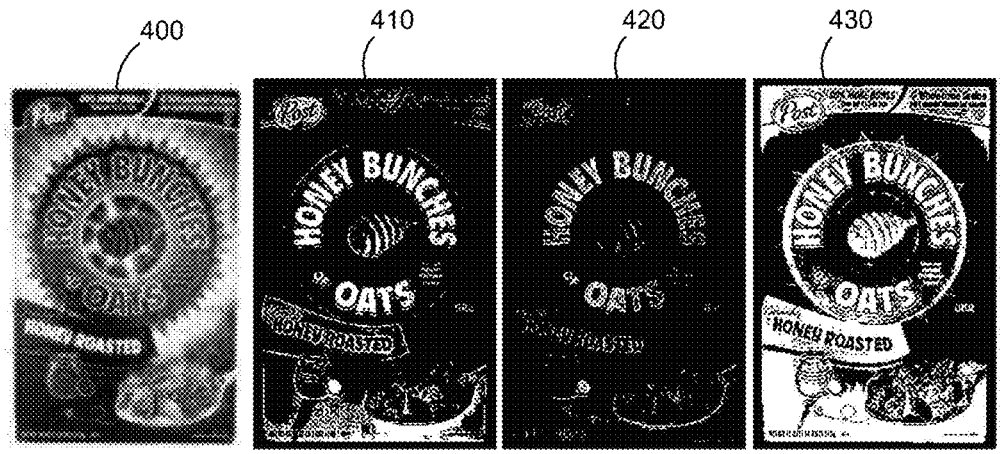
FIGS. 6A-6J are representative sample embodiments for an identifying a consumer product in the form of a cereal box, including showing an image thereof and binarization of same, extraction of image features, overcoming rotation variance, adjusting for skew, and applying same to an unknown image.

Comparative Example:

The first stage to identify consumer products in images begins by creating or receiving a single grayscale or color image 400 for each known consumer product, FIG. 6A. Each image 400 is converted to three binary images 410, 420, 430 using three thresholds of 25%, 50%, and 75%. The lower threshold is designed to separate two overlapping dark features while the upper threshold separates relatively light features. The 50% threshold separates mid-tone colors.

Figure 6B:
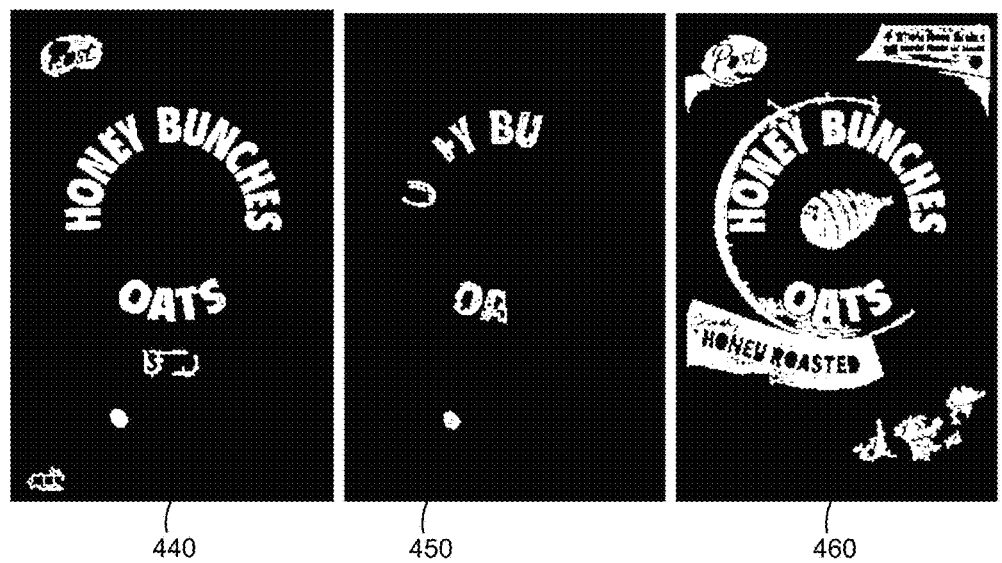

Using the three binary images, connected-component analysis is used to identify all white, mid-tone or all black connected pixels 440, 450, 460 in FIG. 6B. Tunable thresholds for size, shape, aspect ratio, and solidity limit are set by which black and white connected components become classified as image features. The letters in FIG. 6B show various ones of the image features.

Figure 6C:
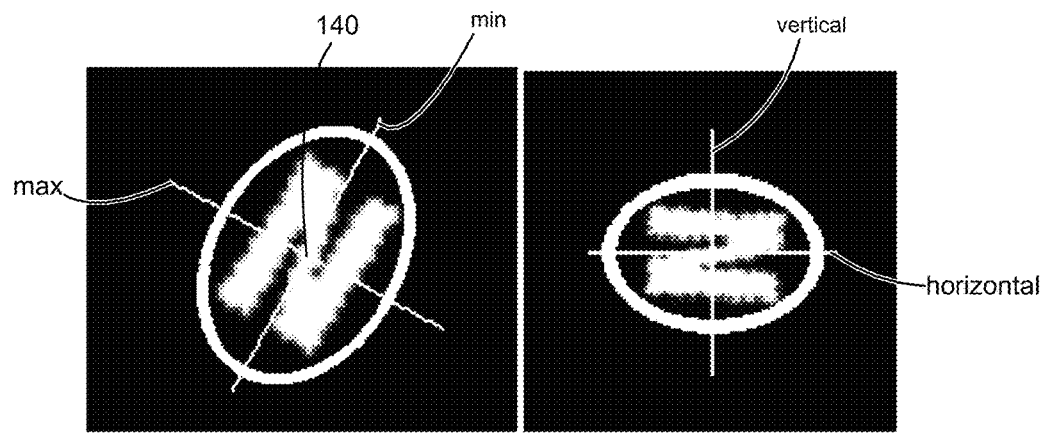
Figure 6D:

To ensure rotation invariance, FIG. 6C shows that an ellipsoidal region surrounding an image feature is rotated about its centroid 140 to align the maximum and minimum axes with the horizontal and vertical axis, respectively. The ellipse has the same second moments as the identified image feature. This makes it possible to accurately identify objects in images regardless of rotation. FIG. 6D shows the auto-rotation process for each of the image features defined by the letters B-U-N-C-H-E-S as found in an image 460 and the results after rotation 470.

Figure 6E:
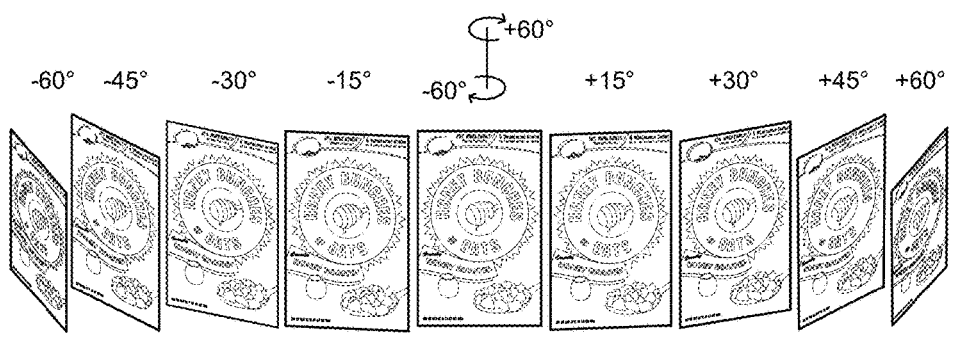

Next, each rotated image feature is padded symmetrically so that the dimensions for pixel width and height are the same. The padded image is down-sampled to a 30×30 binary image, which is stored in a database as a 900 bit string. The database entry also contains the x and y coordinates of the centroid of the image feature, the size of the region in pixels before its re-sampling, the aspect ratio, and the rotation angle of the feature. The steps listed above are repeated for each of the newly transformed images, and the results are stored in a database. To account for perspective changes in images, FIG. 6E shows the coordinates of the original image 400 that are multiplied by a series of affine transformation matrices that simulate +/−60 degrees of rotation about the X and Y axes in steps of 15 degrees.

Figure 6F:
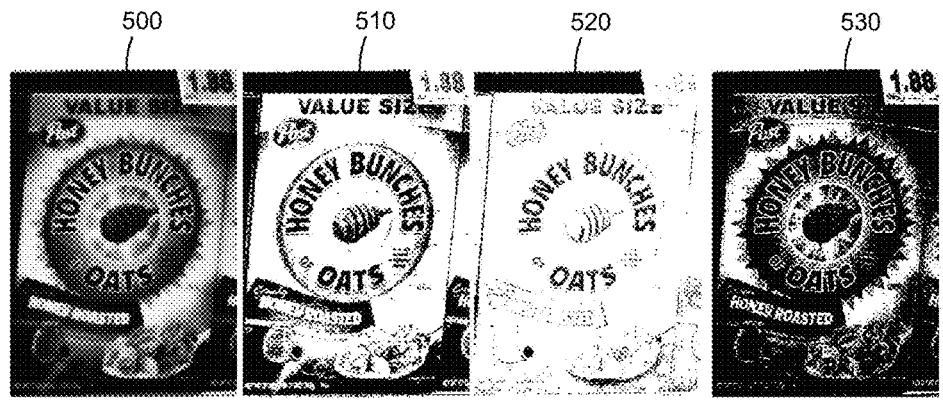
Figure 6G:
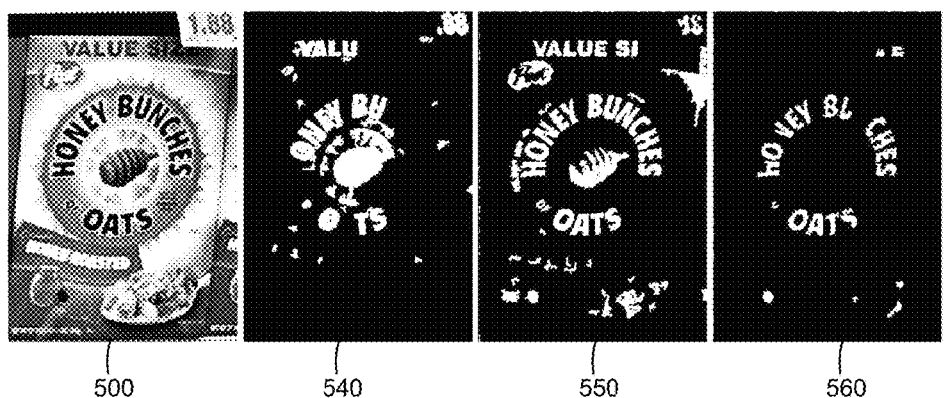

In a next stage, embodiments of the algorithm search for known features in an unknown image 500, FIG. 6F. All steps listed above are repeated for the unknown image with the exception of the perspective compensation of FIG. 6E since the known images have already been transformed to compensate for any perspective changes in the unknown image. The unknown image 500 in FIG. 6F shows an image similar to image 400 (FIG. 6A), but with some distortion, occlusion, lighting, and content differences. The unknown image is converted to three binary images 510, 520, 530 using the thresholds noted in FIG. 6A. Next, connected components 540, 550, 560 are noted in FIG. 6G that correspond to each of the three binary images of FIG. 6F that also meet the size and shape restrictions of FIG. 6B, and such connected components become classified as image features.

Figure 6H:
Figure 6I:
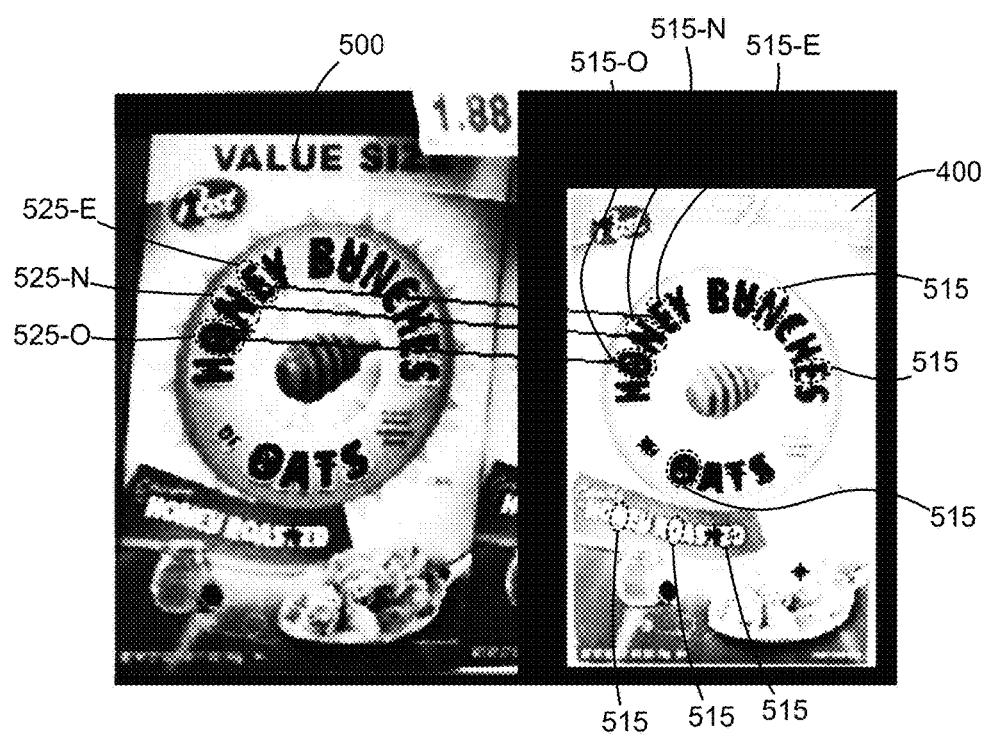

After all the image features in the unknown image are auto-rotated and auto-scaled, three image features from the unknown image are chosen at random, here the letters N-O-E in FIG. 6H. The database of stored image features is searched for known features that are close matches. Artisans will notice that many image features 515 exist for the letters N-O-E in FIG. 6I. Yet, the database is indexed according to the aspect ratio of the auto-rotated features so that feature matching is only performed on two image features with similar aspect ratios. Before comparison, all binary images are padded so that the dimensions are 30×30 pixels corresponding to the image features already stored for the known image. The matching process is a simple bitwise XOR comparison between the stored bits for the known image and the unknown image, followed by a population count. Low population counts of binary is correspond to strong matches.

When three matches in a given spatial window are identified, e.g., 525-O, 525-N, 525-E match to image features 515-O, 515-N, 515-E as they have similar triangles, this defines an affine homography matrix that maps the coordinates of the features in the unknown image to the corresponding coordinates of the features in the known image. As before:

$$\begin{bmatrix} x_{1b} & x_{2b} & x_{3b} \\ y_{1b} & y_{2b} & y_{3b} \\ 1 & 1 & 1 \end{bmatrix} = \begin{bmatrix} h_{11} & h_{12} & h_{13} \\ h_{21} & h_{22} & h_{23} \\ 0 & 0 & 1 \end{bmatrix} * \begin{bmatrix} x_{1a} & x_{2a} & x_{3a} \\ y_{1a} & y_{2a} & y_{3a} \\ 1 & 1 & 1 \end{bmatrix}$$

$$\begin{bmatrix} \text{Unknown} \\ \text{Coordinates} \end{bmatrix} = \begin{bmatrix} \text{Homography} \\ \text{Matrix} \end{bmatrix} * \begin{bmatrix} \text{Known} \\ \text{Coordinates} \end{bmatrix}$$

Figure 6J:
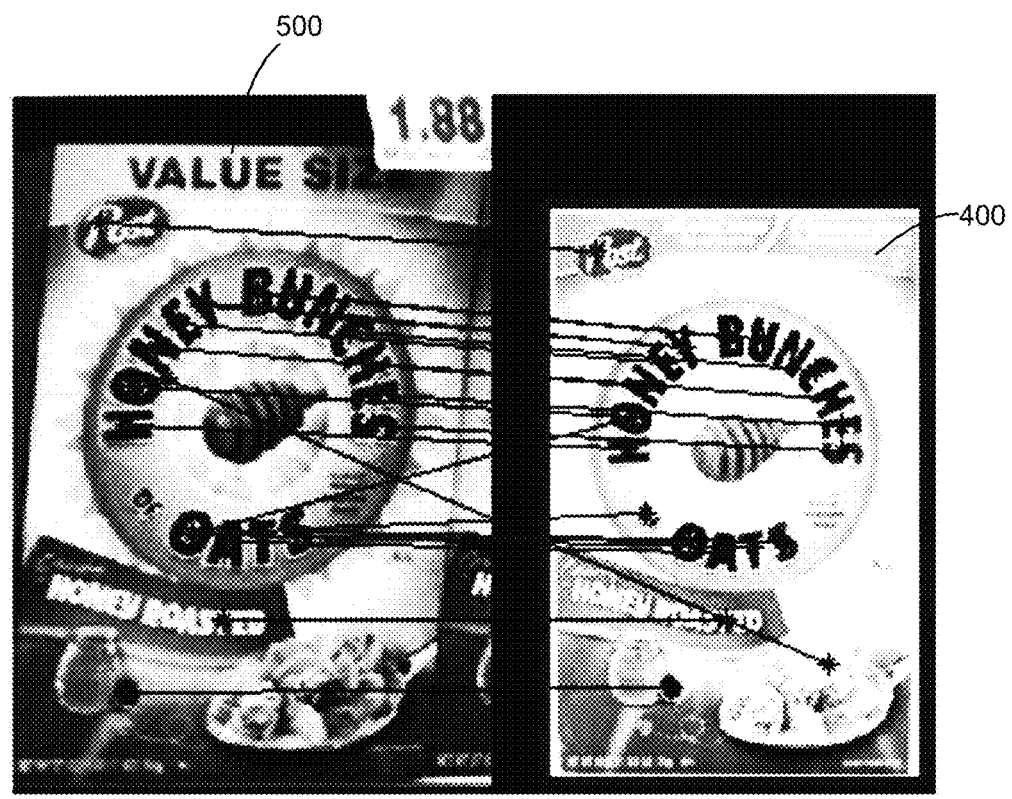

If the three proposed matches are actual matches between one another, then the homography matrix can be multiplied by the centroid coordinates of the remaining features in the known image to determine the location of the features in the unknown image. If at least 90% of the features in the known image have matches in the unknown image, then the output is saved as a possible match. This process is repeated for a fixed number of iterations, each time selecting a different set of three image features in an unknown image with matches contained in a single known object. If more than one possible match is contained in a single area, the object with the higher percentage of matching features is chosen. Because it is not necessary to find all of the features from the known image, this method of object detection is robust against partial occlusion. This leverages techniques from a process called Random Sample Consensus (RANSAC), an iterative method that solves mathematical models in the presence of outliers. FIG. 6J shows possible matching pairs in the known 400 and unknown image 500 after several iterations of RANSAC. Some of the lines represent false positives, but the majority of potential matches correspond to real matching features.

Figure 7A:
FIGS. 7A and 7B are comparative examples showing the effectiveness of object recognition according to the present invention in comparison to object recognition according to the prior art SIFT algorithm, including the minimization of false positives.
Figure 7B:
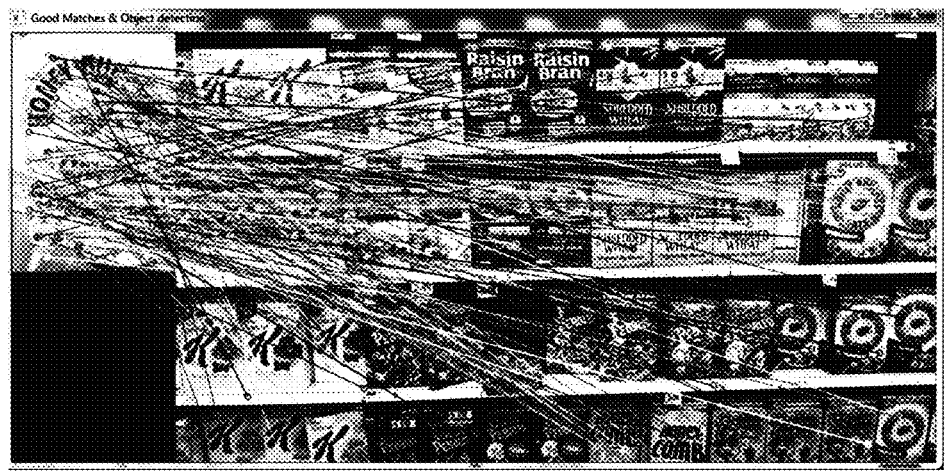

In FIG. 7A, the boxes 600 drawn around each consumer product represent all of the successfully identified image features according to the techniques of the present invention. However, none of the image features were successfully identified in FIG. 7B using the SIFT algorithm technique of the prior art. SIFT also shows a large number of false positive matches (lines) while FIG. 7A shows many fewer false positive matches. It is clear that present techniques work well regardless of occlusion, lighting, scale differences, rotation, and perspective changes.

Sample Code of the Inventor to Execute Embodiments of the Disclosure:
    Matlab code
    Create Unknown image
        Save it in unknown_images
        Name it 1.jpg (The name matters)
    Define coordinates of known images within unknown image
        Save in a file called extracted_images.csv
        Each row corresponds to a different product
        The column order is as follows
            Product name—Vanilla Almond Special K
            Image name—1 .jpg
            Upper Left X Coordinate —34
            Upper Left Y Coordinate—231
            Upper Right X Coordinate—485
            Upper Right Y Coordinate—232
            Lower Right X Coordinate—506
            Lower Right Y Coordinate—940
            Lower Left X Coordinate—69
            Lower Left Y Coordinate—936
    Run the file called run extract image
        This will extract images from the unknown image
        Each image will be saved in a folder called "known_images"
    Run find_features('known')
        This identifies features from known images.
        Look in the folder called "known_output" to help with debugging
        Color coded images show which features get extracted.
        A file called known_data.csv saves the following data
            image_name_no_extension
            centroid_x
            centroid_y
            axis_ratio
            white_black_index (white=1,black=2) color of blob after binarization
            number_of_rows_in_blob_image
            number_of_columns_in_blob_image
            total_number_of_pixels_in_blob_image_black_and_white
            orientation_angle_of_ellipse_surrounding_blob
            area_pixels_in_blob_image
    Run find_features('unknown')
        This identifies features from unknown images.
        Look in the folder called "unknown_output" to help with debugging
        Color coded images show which features get extracted
        A file called unknown data.csv saves the following data
            image_name_no_extension
            centroid_x
            centroid_y
            axis_ratio
            white_black_index (white=1,black=2) color of blob after binarization
            number_of_rows_in_blob_image
            number_of_columns_in_blob_image
            total_number_of_pixels_in_blob_image_black_and_white
            orientation_angle_of_ellipse_surrounding_blob
            area_pixels_in_blob_image Run find_matches
   This compares unknown features to known features. XOR followed by population count
   Matching features are stored in matching_data.csv with these fields
      known_image_name_no_extension
      known_blob_image_index
      known_centroid_x
      known_centroid_y
      known_axis_ratio
      known_white_black_index (white=1,black=2) color of blob after binarization
      known_number_of_rows_in_blob_image
      known_number_of_columns_in_blob_image
      known_total_number_of_pixels_in_blob_image_black_and_white
      known_orientation_angle_of_ellipse_surrounding_blob
      known_area_pixels_in_blob_image
      known_image_name_no_extension
      known_blob_image_index
      known_centroid_x
      known_centroid_y
      known_axis_ratio
      known_white_black_index (white=1,black=2) color of blob after binarization
      known_number_of_rows_in_blob_image
      known_number_of_columns_in_blob_image
      known_total_number_of_pixels_in_blob_image_black_and_white
      known_orientation_angle_of_ellipse_surrounding_blob
      known_area_pixels_in_blob_image
      Error—Number of pixels that do not match b/t known and unknown Run make_output_images_with_connecting_lines
   This takes the output from the previous step and creates images with lines connecting known and unknown features.
   This is only for illustrative purposes.

Run make_output_image_labeled
   This script randomly picks three features from a known image that have matches in the unknown image.
   Those three point pairs are the exact number of points to define an affine homography matrix shown below.

$$\begin{bmatrix} x_{1b} & x_{2b} & x_{3b} \\ y_{1b} & y_{2b} & y_{3b} \\ 1 & 1 & 1 \end{bmatrix} = \begin{bmatrix} h_{11} & h_{12} & h_{13} \\ h_{21} & h_{22} & h_{23} \\ 0 & 0 & 1 \end{bmatrix} * \begin{bmatrix} x_{1a} & x_{2a} & x_{3a} \\ y_{1a} & y_{2a} & y_{3a} \\ 1 & 1 & 1 \end{bmatrix}$$

$$\begin{bmatrix} \text{Unknown} \\ \text{Coordinates} \end{bmatrix} = \begin{bmatrix} \text{Homography} \\ \text{Matrix} \end{bmatrix} * \begin{bmatrix} \text{Known} \\ \text{Coordinates} \end{bmatrix}$$

This homography matrix is multiplied by the centroid coordinates of each feature in the known image to determine where those features should be in the unknown image.
   If enough features exist in the unknown image close to the calculated location, the affine transform matrix is multiplied by the coordinates of the border of the known image to determine the coordinates in the unknown image, and the remapped border is drawn in the unknown image.
   This process is repeated 10,000 times for each known image, each time randomly selecting a different set of 3 matching feature pairs.
   An image called final_image.png is created with color-coded borders in the unknown image that correspond to known images, wherein The foregoing illustrates various aspects of the invention. It is not intended to be exhaustive. Rather, it is chosen to provide the best illustration of the principles of the invention and its practical application to enable one of ordinary skill in the art to utilize the invention. All modifications and variations are contemplated within the scope of the invention as determined by the appended claims. Relatively apparent modifications include combining one or more features of various embodiments with features of other embodiments.

The invention claimed is:

1. A method for identifying consumer products in images, comprising:
   capturing first images of known consumer products;
   converting each of the first images to a plurality of binary first images of varying binary thresholds;
   identifying a first set of image features from the plurality of binary first images;
   receiving second images of unknown consumer products;
   converting each of the second images to a plurality of binary second images of the varying binary thresholds;
   identifying a second set of image features from the plurality of binary second images;
   finding a subset of image features from each of the first set of image features and the second set of image features that substantially match;
   devising triangles between the subset of image features in said each of the plurality of binary first images and of the plurality of binary second images; and
   determining if the triangles are similar to identify or not possible matches of the known consumer products within the second images, thus identifying or not known consumer products at a location from whence the second images were captured,
   wherein each image feature is a set of connected points having a centroid and wherein each centroid is used in devising the triangles, wherein each of the first and second images have pluralities of pixels defined in bits and the subset of image features reside in some pixels but not all of the pluralities of pixels, wherein the finding of the subset of image features further includes XORing the bits of two of the subset of image features one each from the first and second images and counting the numbers of 1 bits, wherein a match between the two of the subset of image features exists if the number of the 1 bits does not exceed ten percent of the total number of the bits in the XORing operation.

2. The method of claim 1, further including determining line lengths between each of the centroids of the image features in the subset of image features.

3. The method of claim 2, further including comparing the line lengths between said each of the first images and the second images.

4. The method of claim 1, further including restricting a pixel distance between the subset of image features during the finding of the subset of image features.

5. The method of claim 1, further including determining whether the subset of image features reside in a corresponding portion of the first and second images.

6. The method of claim 1, further including determining whether the subset of image features has a corresponding orientation in the first and second images.

7. The method of claim 1, further including determining whether the subset of image features correspond mostly to black or white image features.

8. The method of claim 1, further including determining an aspect ratio in pixels for each image feature of the subset of image features in the first and second images.

9. A method for identifying consumer products in images, comprising:
   storing first images of known consumer products;
   converting each of the first images to a plurality of binary first images of varying binary thresholds;
   identifying a first set of image features from the plurality of binary first images that meet a predefined set of criteria;
   receiving second images of unknown consumer products;
   converting each of the second images to a plurality of binary second images of the varying binary thresholds;
   identifying a second set of image features from the plurality of binary second images that meet the predefined set of criteria;
   finding three image features from each of the plurality of binary first and second images that correspond to one another;
   devising triangles between the three image features in said each of the plurality of binary first and the second images; and
   comparing the triangles for similarity to identify or not possible matches of the known consumer products within the second images, thus identifying or not known consumer products at a location from whence the second images were captured,
   wherein each image feature of the three image features is a set of connected points having a centroid and wherein each triangle during the devising the triangles is devised by using a distance between a first centroid of a first image feature and a second centroid of a second image feature, wherein each of the first and second images have pluralities of pixels defined in bits and the three image features reside in some pixels but not all of the pluralities of pixels, wherein the finding of the three image features corresponding to one another further includes XORing the bits of two of the three image features one each from the first and second images and counting the numbers of 1 bits, wherein a match between the two of the three image features exists if the number of the 1 bits does not exceed ten percent of the total number of the bits in the XORing operation.

10. The method of claim 9, further including determining line lengths between each of the centroids of the three image features.

11. The method of claim 10, further including comparing the line lengths between said each of the first and second images.

12. The method of claim 9, further including restricting a pixel distance between the three image features during the finding of the three image features.

13. A method for identifying consumer products in images, comprising:
   receiving first images of known consumer products;
   converting each of the first images to a plurality of binary first images of varying binary thresholds;
   identifying a first set of image features from the plurality of binary first images that meet a predefined set of criteria;
   receiving second images of unknown consumer products;
   converting each of the second images to a plurality of binary second images of the varying binary thresholds;
   identifying a second set of image features from the plurality of binary second images that meet the predefined set of criteria;
   finding three image features in each of the first and the second images that correspond to one another;
   devising triangles between the three image features in said each of the first and the second images; and
   determining if the triangles are similar to identify or not possible matches of the known consumer products within the second images, thus identifying or not known consumer products at a location from whence the second images were captured,
   wherein each image feature of the three image features is a set of connected binary pixels having a centroid pixel defining a center of a shape of each image feature and wherein each centroid pixel is used during the devising of the triangles, wherein each of the first and second images have pluralities of pixels defined in bits and the three image features reside in some pixels but not all of the pluralities of pixels, wherein the finding of the three image features corresponding to one another further includes XORing the bits of two of the three image features one each from the first and second images and counting the numbers of 1 bits, wherein a match between the two of the three image features exists if the number of the 1 bits does not exceed ten percent of the total number of the bits in the XORing operation.

14. The method of claim 13, wherein the identifying the first and the second set of image features from the binary first and second images, respectively, includes identifying connected components in the binary first and binary second images, respectively.

15. The method of claim 14, further including filtering the connected components to exclude from the three image features in said each of the first and second images the connected components not meeting a predefined size, a predefined aspect ratio, a predefined shape or a predefined limit of solidity.

16. The method of claim 14, further including standardizing a size of each image feature of the three image features in said each of the first images and the second images.

17. The method of claim 14, further including storing the first images of the known consumer products.

* * * * *